(12) United States Patent
Jung

(10) Patent No.: US 6,678,893 B1
(45) Date of Patent: Jan. 13, 2004

(54) BIDIRECTIONAL TRUNK AMPLIFIER AND CABLE MODEM FOR CABLE HYBRID FIBER AND COAX NETWORK WHICH UTILIZES AN UPSTREAM PILOT SIGNAL

(75) Inventor: Choon-Jae Jung, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/222,309

(22) Filed: Dec. 28, 1998

(30) Foreign Application Priority Data

Dec. 26, 1997 (KR) ............................................ 97-74597

(51) Int. Cl.⁷ .............................................. H04N 7/173
(52) U.S. Cl. ........................ 725/111; 725/131; 725/139; 725/151
(58) Field of Search ................................. 725/111, 129, 725/68, 126, 127, 131, 139, 151

(56) References Cited

U.S. PATENT DOCUMENTS

| | | | | |
|---|---|---|---|---|
| 4,092,596 A | * | 5/1978 | Dickinson et al. | 375/286 |
| 4,752,954 A | * | 6/1988 | Masuko | 725/130 |
| 5,263,021 A | * | 11/1993 | Ortel | 370/487 |
| 5,512,937 A | * | 4/1996 | Beierle | 348/14.02 |
| 5,987,060 A | * | 11/1999 | Grenon et al. | 375/213 |
| 6,002,722 A | * | 12/1999 | Wu | 375/295 |
| 6,140,822 A | * | 10/2000 | Williams | 324/620 |
| 6,425,132 B1 | * | 7/2002 | Chappell | 725/107 |

* cited by examiner

Primary Examiner—Andrew Faile
Assistant Examiner—Jason Salce

(57) ABSTRACT

A method of utilizing a bidirectional amplifier in a cable hybrid fiber and coax (HFC) and a cable modem utilizing an upstream signal. The invention provides an upstream pilot signal from the cable modem and automatically controls the gain of the signal so that the headend receives a constant level upstream pilot signal from each terminal. A cable modem for bidirectional services in the HFC network has a saw filter, a mixer & AGC, a LPF, a tuner, a gain controller, a downstream demodulator, an upstream modulator, a media access controller (MAC), a CPU, a programmable attenuator, a pilot signal generator and a switch connecting the tuner and the pilot signal generator under the control of the CPU. A bidirectional trunk amplifier for bidirectional services in the HFC network, has a directional filter (DF) which separates the upstream signals from the downstream signals, a pad, having characteristics approximately equivalent to the frequency characteristics of the coaxial cable, for compensating the attenuated value of the coaxial cable and matching the input level, an equalizer for compensating the frequency deviation occurring in the line, an amplifier for amplifying the input signal to a desired level, and a level controller for controlling the slope and the automatic gain.

10 Claims, 7 Drawing Sheets

BIDIRECTIONAL TRUNK AMPLIFIER AND CABLE MODEM FOR CABLE HYBRID FIBER AND COAX NETWORK WHICH UTILIZES AN UPSTREAM PILOT SIGNAL

BACKGROUND OF THE INVENTION

1. Field of the Invention

The present invention is related to an HFC (Hybrid Fiber and Coax) network and cable modem. More specifically, the present invention relates to a bidirectional amplifier, utilizing a pilot signal to detect signal levels, for the purpose of stabilizing signal transmission.

2. Description of the Related Art

FIG. 1 shows a general HFC network, which comprises a headend (100), that is, a transceiver, for transmitting signals to the transmission lines, and, in the case of a bidirectional system, receiving signals from the transmission lines; optic fibers, for transmitting optic signals to the ONU (Optical Network Unit); an ONU (101), for converting the optic signals, which are inputted from the headend through the optic fibers, into electrical signals; amplifiers (102) for amplifying the signals to a specified level; and an end-user terminal, for use by a user in conjunction with a cable modem.

In the prior art HFC network, when downstream signals are transmitted from the headend to the ONU, pilot signals having a frequency of 451.25 MHz are generated, and by using these signals, level changes which occur due to the length of cables can be reduced.

The headend usually utilizes the frequency band between 50~860 MHz when downstreaming the signals, though there are some differences among national standards.

The HFC network utilizes a plurality of intermediate amplifiers. However, the longer the distance over which the signals are transmitted, the greater the signal level varies during transmission. Therefore, the amplifiers (102) are utilized between the HFC network and the end-user terminals; the amplifiers (102) are capable of performing Automatic Gain Control (AGC).

Referring to FIG. 2, the prior art cable modem comprises a saw filter (200), a mixer & AGC (201), a LPF (Low Pass Filter) (202), a tuner (203), a gain controller (204), a downstream demodulator (205), a MAC (Media Access Controller) (206), a programmable attenuator (207), an upstream modulator (208), and a CPU.

The tuner (203) down-converts the upconverted downstream signals into IF (Intermediate Frequency) signals having constant frequency by utilizing RF (Radio Frequency) signals. In the North American specification, random RF signals having an input range of about 54~860 MHz are converted into IF signals having a single range of 43.75 MHz.

The gain controller (204) controls the level of the input signals so that the level of the input signals is kept constant.

The downstream demodulator (205) recovers the base band signals to the pre-modulated digital signals by demodulating the modulated signals.

The MAC (206), in relation to a media access, divides the demodulated signals into controlling signals and data signals, or transmits the data to the ethernet transceiver under the control of the CPU.

The upstream modulator (208) modulates the signals to be transmitted to the headend.

The mixer & AGC (201) converts the IF signals in the range of 43.75 MHz into the base band of 6 MHz, and controls the gain.

The LPF (202) passes only the low band (6 MHz) signals and removes the high band signals, among the signals generated from the mixer.

The CPU (209) controls the overall operation of the modem.

The programmable attenuator (207) controls the level of the modulated signals.

FIG. 3 shows the frequency band of the pilot signal of the downstream line of the prior art network. The pilot signal of 451.25 MHz is generally utilized so as to detect the level of the downstream signals. If necessary, another pilot signal of 73 MHz is utilized so as to reduce the changes of the low or high range.

Therefore, the prior art only performs one directional level control, that is, the prior art considers only the level changes of the downstream signals.

To minimize the level changes, the gain of the intermediate amplifiers are automatically controlled by utilizing the downstream pilot signal so that the output level from the amplifiers may be kept constant. Therefore, a constant signal level may be maintained in the end-user terminal. But, in the case of bidirectional service in the HFC network, not only the downstream but also the upstream signals are important. Currently, bidirectional services do not use a pilot signal to stabilize upstream transmission.

Because of the importance of the upstream signal, a constant signal level must be provided, in accordance with each of the national specifications. Furthermore, because the upstream signals are affected by conditions such as Ingress noise, stricter control is required.

SUMMARY OF THE INVENTION

It is an object of the present invention to provide bidirectional trunk amplifiers and a cable modem for HFC network utilizing an upstream pilot signal.

It is another object of the present invention to provide the upstream pilot signal by the cable modem and to automatically control the gain of the signal so that the headend receives a constant level upstream pilot signal from each terminal.

A cable modem for bidirectional services in the HFC network comprises a tuner for down-converting the up-converted downstream signals into IF (Intermediate Frequency) signals having constant frequency by utilizing RF (Radio Frequency) signals; a saw filter for filtering a specified band frequency received from the tuner; a mixer&AGC (Automatic Gain Controller) for converting the filtered IF signals into the base band signals, and controlling the gain; a LPF (Low Pass Filter) for passing only the low band signals and removing the high band signals among the signals generated from the mixer; a gain controller for controlling the level of the signals received from the mixer&AGC so that the signal level is kept constant; a downstream demodulator for recovering the base band signals from the LPF into the pre-modulated digital signals by demodulating the modulated signals; a MAC (Media Access Controller) for dividing the demodulated signals into control signals and data signals or transmitting the data to the transceiver under the control of the CPU; an upstream modulator for modulating the signals received from the MAC to be transmitted to the headend; a programmable attenuator for controlling the level of the modulated signals; a CPU (Central Processing Unit) for controlling the entire modem; a pilot signal generator for generating the pilot signal; and a switch connecting the tuner and the pilot signal generator under the control of the CPU.

The pilot signal generator comprises an oscillator which generates a radio frequency upstream pilot signal, a multiplier which multiplies the radio frequency upstream pilot signal to a desired frequency and outputs a multiplied upstream pilot signal, an AGC (automatic gain control) which outputs a level control signal, a level controller which controls the level of the multiplied upstream pilot signal in accordance with the level control signal to maintain the multiplied upstream pilot signal at a constant level, a radio frequency amplifier which amplifies the level controlled multiplied upstream pilot signal and outputs an amplified upstream pilot signal, and a BPF (band pass filter) which receives the output of the radio frequency amplifier and passes only the amplified upstream pilot signal.

The pilot signal generator is included in one of a plurality of terminals in the last cell of the tree structure. The pilot generator is generally turned off so as not to interfere with the signals. When the pilot signal is needed, the headend requests the pilot generator to generate the pilot signal The radio frequency amplifier performs the automatic gain control by utilizing the signal of the pilot generator. The pilot signal generator generates a constant pilot signal. The signal received by the headend always has a constant level.

A bidirectional trunk amplifier for bidirectional services in the HFC network comprises a directional filter (DF) for separating the upstream signal and the downstream signal; a pad, having characteristics similar to the frequency characteristics of the coaxial cable, for compensating the attenuated value of the coaxial cable and matching the input level; an equalizer for compensating the frequency deviation caused by the line; an amplifier for amplifying the input signal to a desired level; and a level controller for controlling the slope and the automatic gain.

The bidirectional trunk amplifier performs the AGC so as to provide a stable upstream signal. The level controller comprises a gain block for controlling the gain signal; a slope block for controlling the slope signal; an amplifier for amplifying the gain-controlled signal and the slope-controlled signal; a directional splitter for separating said signals into main and sub signals; and an Automatic Gain Controller and Automatic Slope Controller (AGC&ASC) for controlling the gain block and the slope block.

The amplifier may be applied to trunk amplifiers and to each of the bidirectional amplifiers. The upstream pilot signals are used to stabilize the upstream transmission line. The upstream bidirectional amplifier is automatically gain controlled. The cable modem provides a constant pilot signal. The upstream pilot signal is selected from the upstream frequency band in order to provide a constant level of the signal to the terminal. The cable modem generates a pilot signal only if the headend requires it.

DETAILED DESCRIPTION OF THE PREFERRED EMBODIMENTS

Figure 1:
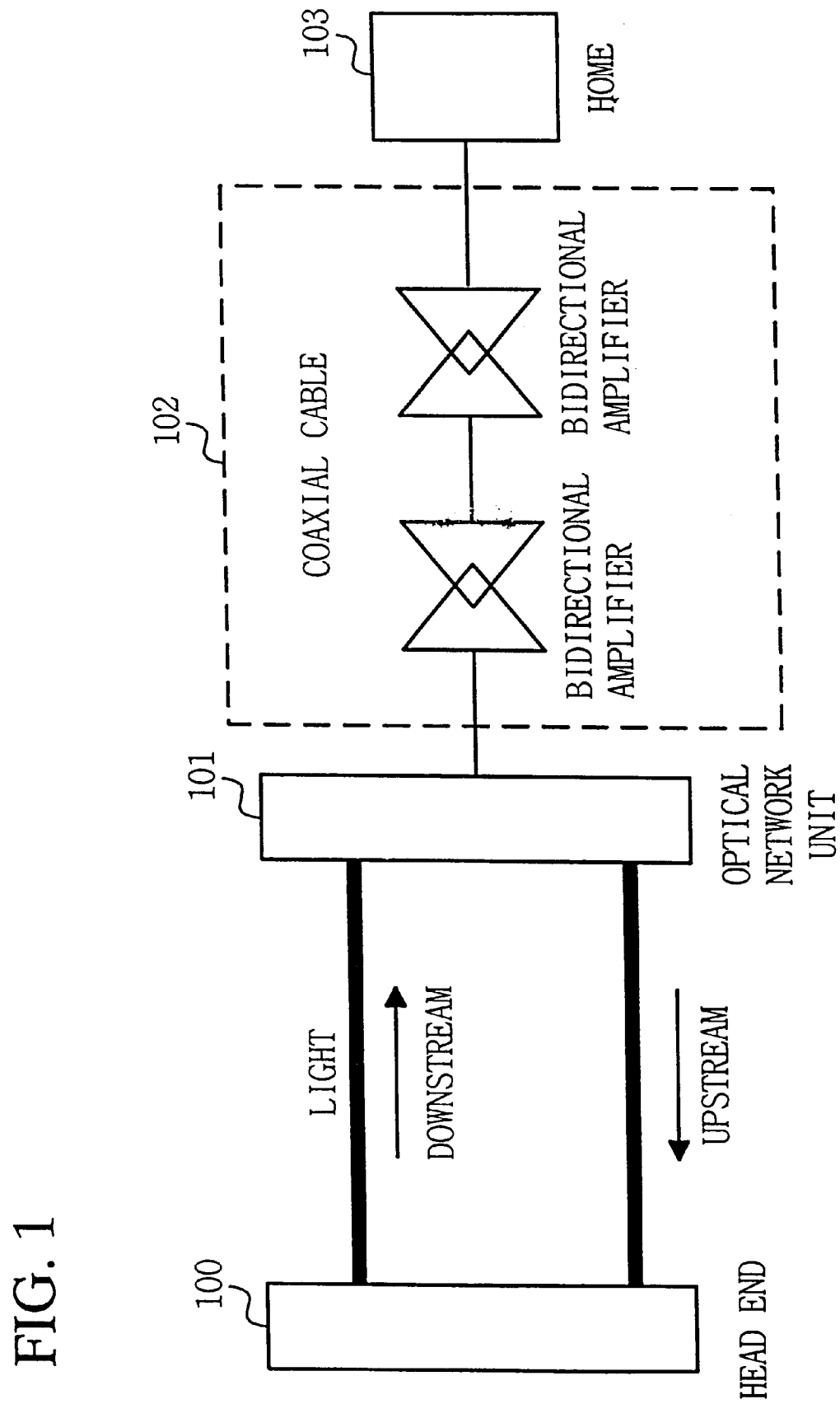
FIG. 1 is a schematic diagram illustrating a prior art HFC network.
Figure 2:
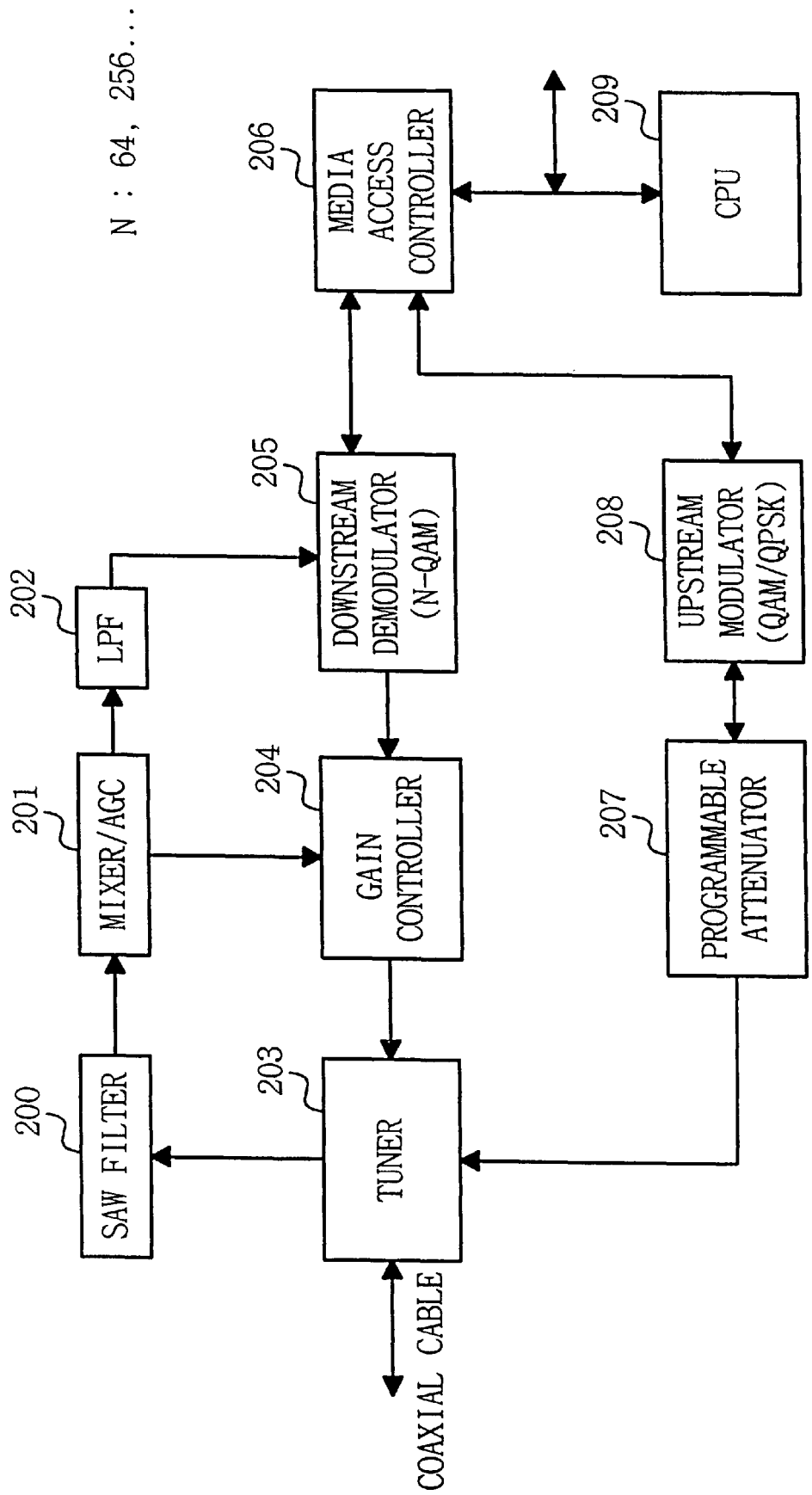
FIG. 2 is a schematic diagram illustrating a prior art cable modem.
Figure 3:
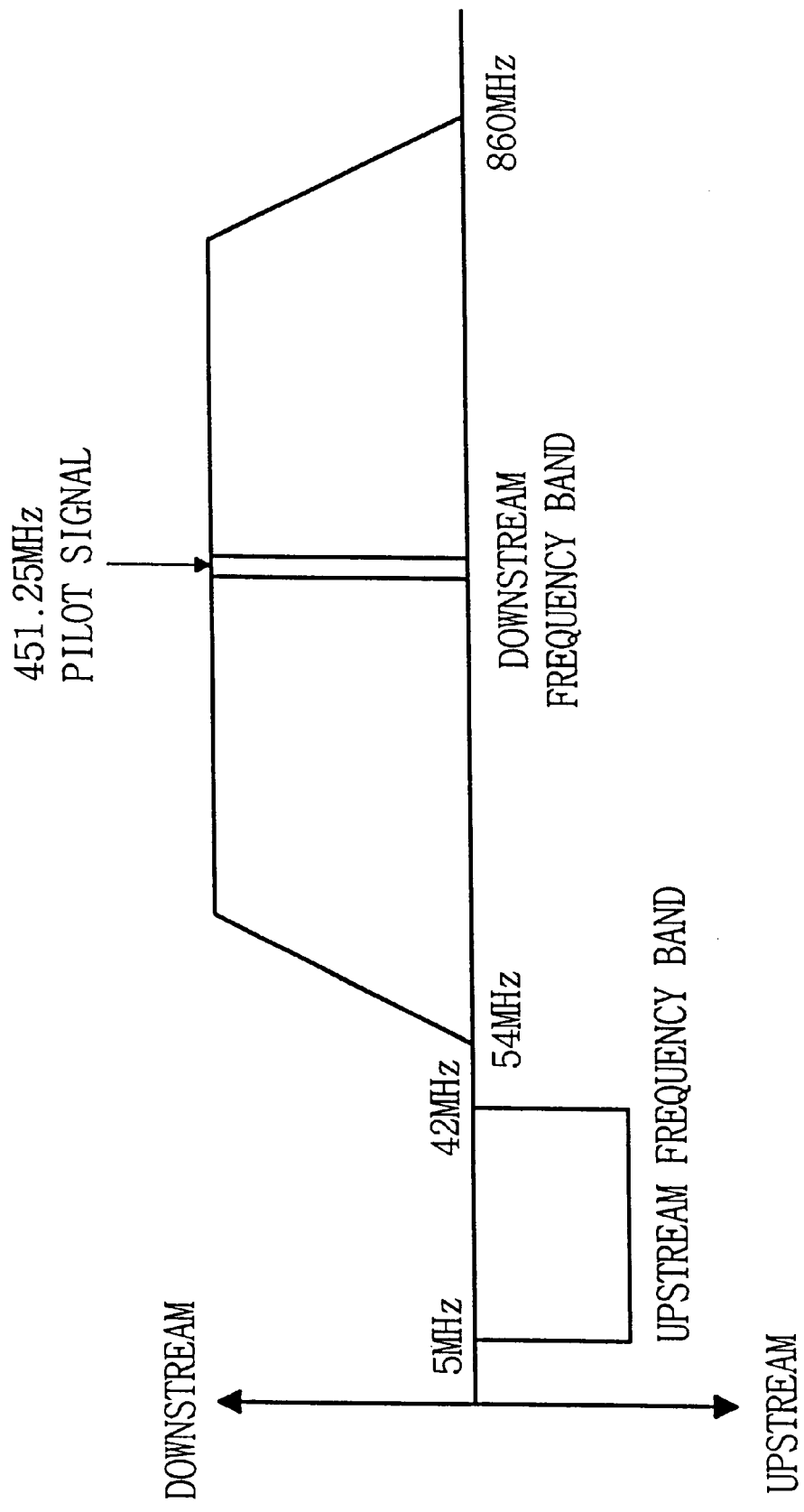
FIG. 3 is a frequency diagram illustrating the pilot signal for the downstream lines according to the prior art.
Figure 4:
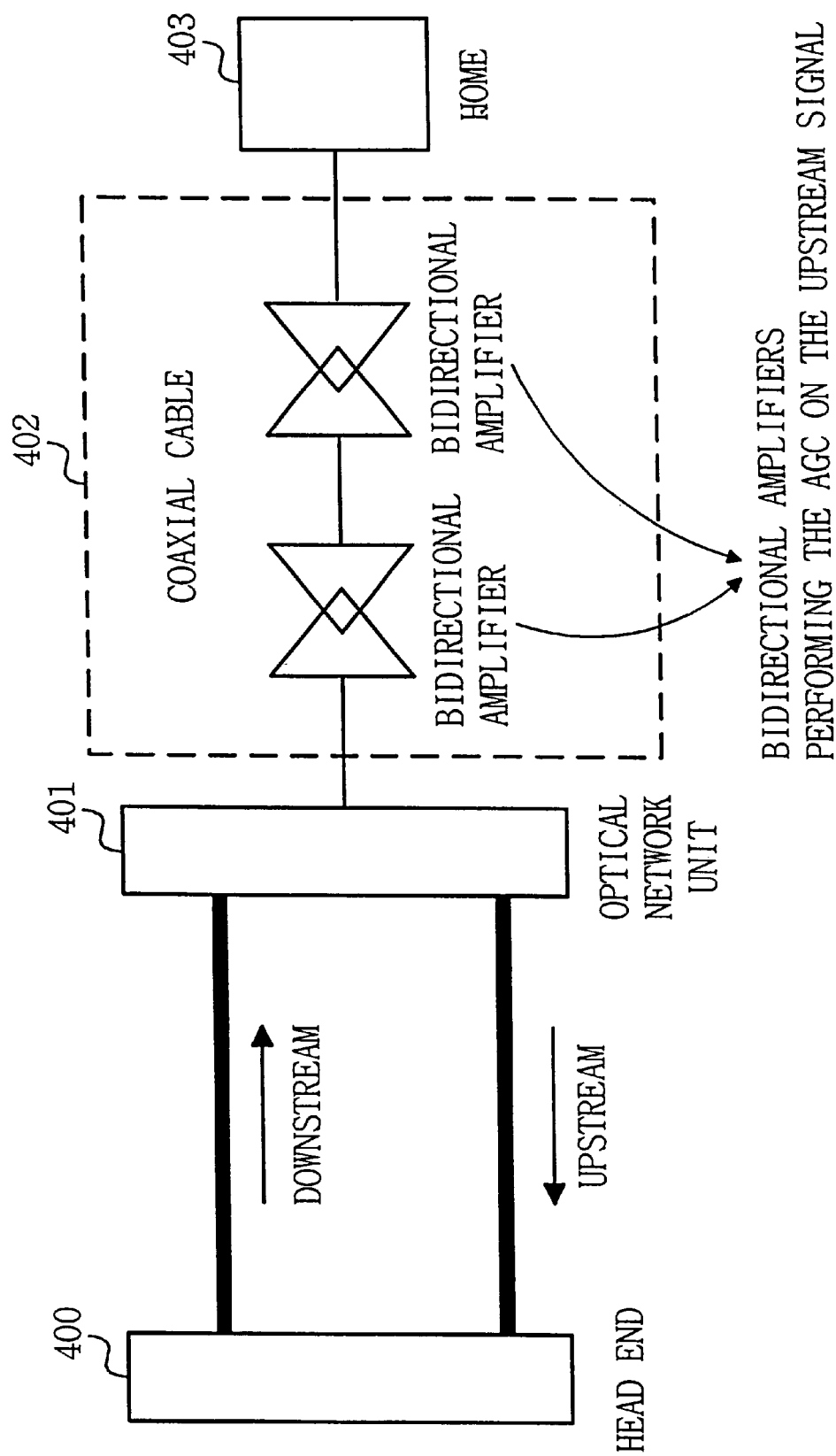
FIG. 4 is a schematic diagram of an HFC network according to the present invention.

Referring to FIG. 4, at least one of the bidirectional amplifiers (402), capable of automatic gain controlling in regard to the upstream and downstream pilot signal, is installed in the HFC network. To provide a stable upstream signal, an automatic gain control is performed by utilizing the existing bidirectional amplifiers (402), and therefore the headend (400) always receives a constant level signal.

In the HFC network, because the distance between the ONU (401) and the end-user terminal (403) is sufficiently great, the amplifiers are utilized so as to continuously provide adequate signals to the end-user terminal. The longer the lines are, the more amplifiers are needed, because line loss increases with the length of the lines.

Figure 5:
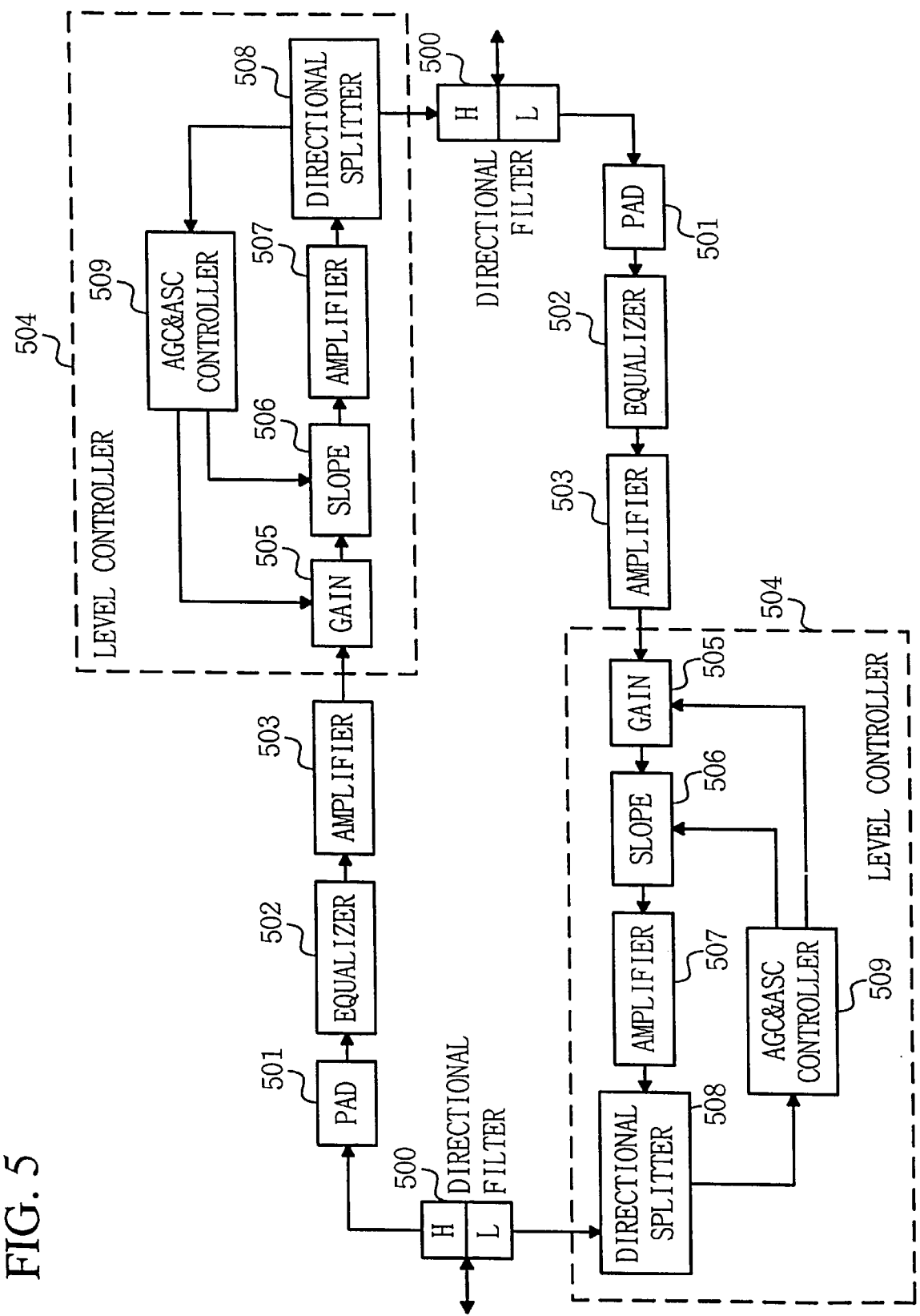
FIG. 5 is a schematic diagram of a bidirectional trunk amplifier capable of automatically controlling the gain in regard to the upstream signal according to the present invention.

Therefore, to maintain a stable signal, the AGC is applied not only to the downstream lines, but also to the upstream lines by utilizing an apparatus such as a bidirectional trunk amplifier shown in FIG. 5, resulting in the stabilization of the upstream lines.

The Directional Filter (DF) (500) separates the downstream and upstream signals. The pad (501) is an attenuator having characteristics approximately equal to the frequency characteristics of the coaxial cable, and compensates for the attenuation of the coaxial cable.

The equalizer (502) compensates the frequency deviation occurring in the lines.

The amplifier (503) amplifies the compensated signals to a constant level.

The level controller (504) adjusts the slope and performs the AGC&ASC in regard to the amplified signals.

In FIG. 5, the upper part of the drawing shows the process for downstream signals, and the lower part shows the process for upstream signals.

This circuit may be applied not only to a trunk amplifier but also to any of the bidirectional amplifiers.

Figure 6:
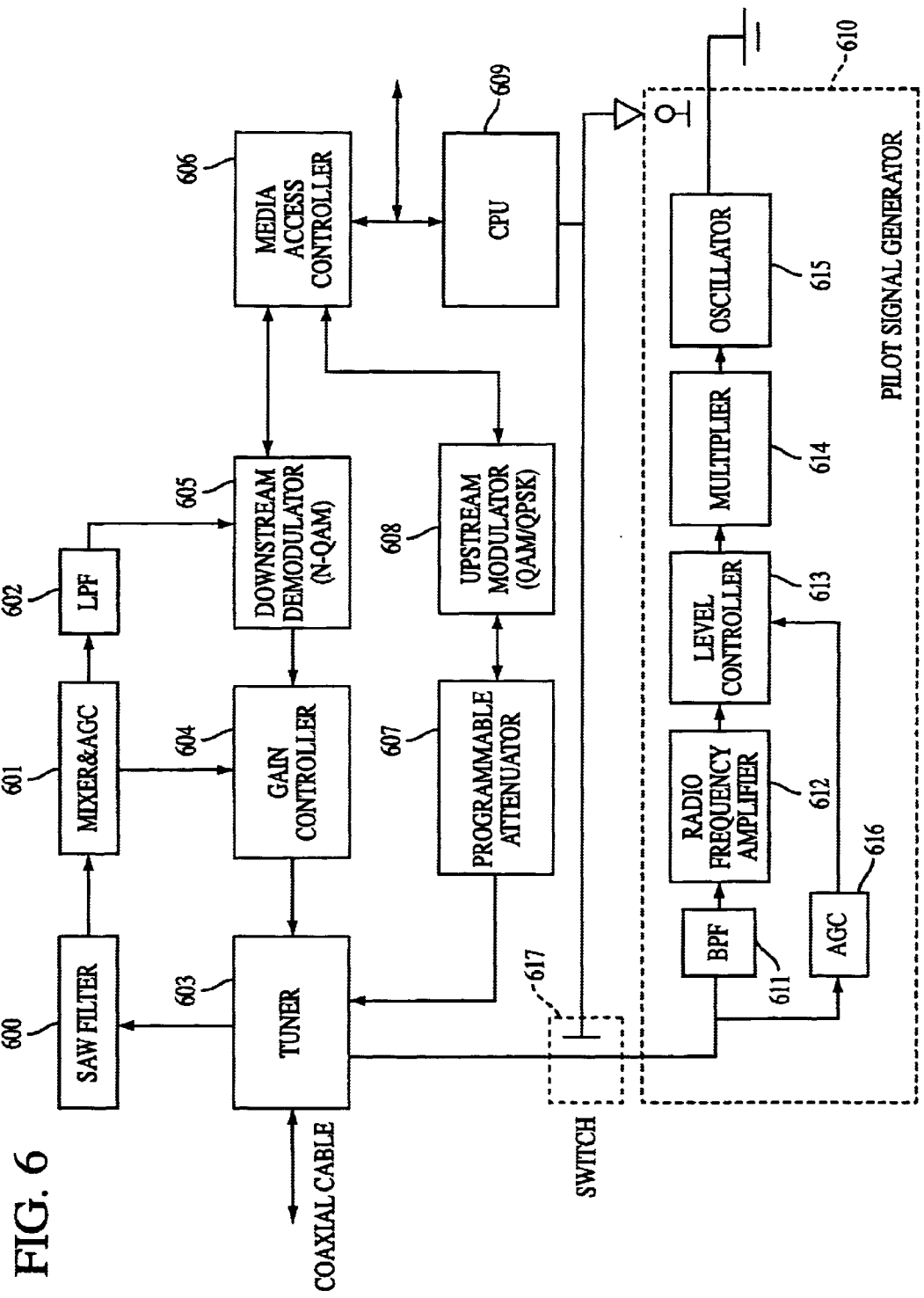
FIG. 6 is a schematic diagram of the cable modem according to the present invention.

Referring to FIG. 6, an upstream pilot signal generator (601) is installed in the existing cable modem. The CPU (609) controls the output from the upstream pilot signal generator and the cable modem. The pilot signal generator (610), which may cause interference with the signals, is turned off. Because the pilot signal may cause noise to be generated, the pilot signal is not always needed. Therefore, the cable modem generates the pilot signal only if the headend (400) requests it. After the headend generates the pilot signal, the amplifiers (402) perform an AGC with respect to the downstream and upstream pilot signals by utilizing the signals of the signal generator.

However, the pilot signal generators do not need to be installed in all of the end-user terminals. If a pilot signal generator can generate a pilot signal from the last cell of the tree structure, the amplifier of the end group can control the gain.

When the headend requests a pilot signal, pilot signal generator (610) generates upstream pilot signals in the following manner. The oscillator (615) outputs a signal having a constant frequency, which is multiplied to a desired frequency by the multiplier (614). The level controller (613) controls the level of the upstream frequency according to the signal received from the AGC (616). The radio frequency amplifier (612) amplifies the signal output from the level controller (613), and the BPF (611) filters the signals so as to pass only the upstream pilot signal. When oscillator (615) is deactivated, switch (617) does not apply the upstream pilot signal to the tuner (603). But when the oscillator is not deactivated, the upstream pilot signal is transmitted through the switch (617) to the tuner. The above process is controlled by the CPU (609).

Figure 7:
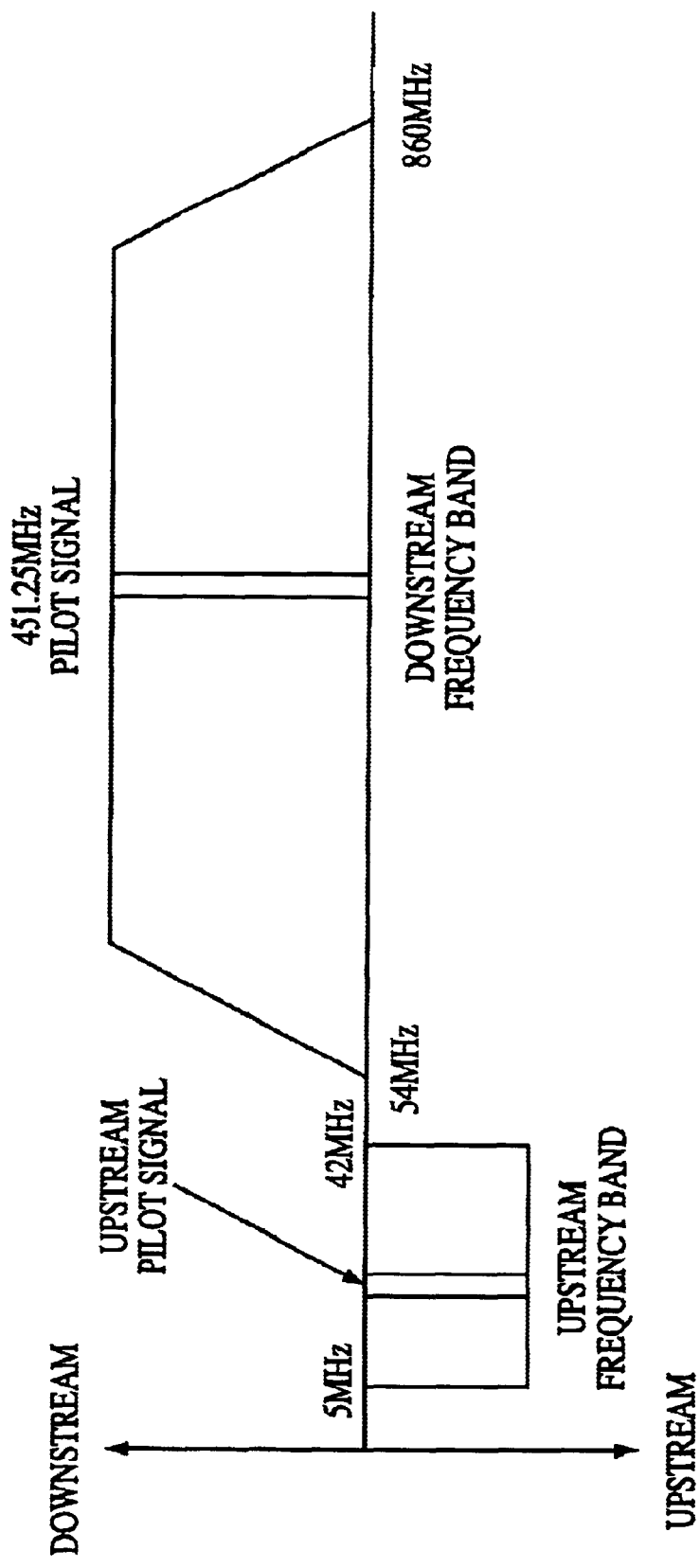
FIG. 7 is a frequency diagram for the upstream pilot signal selected from the upstream frequency band according to the present invention.

The upstream and downstream frequency band range is illustrated in FIG. 7. A desired upstream pilot signal is obtained between 5~42 MHz, which is a relatively low band range, according to the preferred specification.

While only certain embodiments of the invention have been specifically described herein, it will be apparent to one of ordinary skill in the art that numerous modifications may be made thereto without departing from the spirit and scope of the invention.

What is claimed is:

1. A cable modem for bidirectional services in an HFC (Hybrid Fiber and Coax) network, comprising:

a central processing unit (CPU);

a tuner for downconverting upconverted downstream signals into IF (Intermediate Frequency) signals having constant frequency, by utilizing RF (Radio Frequency) signals;

a saw filter for filtering a specified band frequency of the IF signals received from the tuner;

a mixer and AGC (Automatic Gain Controller) for converting the filtered IF signals into base band signals and for outputting a gain control signal;

a LPF (Low Pass Filter) for passing only low band signals and removing high band signals from the signals generated by the mixer and AGC;

a gain controller for controlling the level of the signals received from the mixer and AGC so that the level of the signals output by the mixer and AGC is constant;

a downstream demodulator for recovering and converting the base band signals from the LPF into pre-modulated digital signals by demodulating the modulated signals;

a MAC (Media Access Controller) for dividing the demodulated signals into control signals and data signals and for transmitting upstream data signals to the transceiver under the control of the CPU;

an upstream modulator for modulating the upstream data signals received from the MAC to be transmitted to the headend;

a programmable attenuator for controlling the level of the modulated upstream signals;

a pilot signal generator for generating a pilot signal; and a switch for connecting said tuner and said pilot signal generator under the control of the CPU.

2. The apparatus as set forth in claim 1, wherein said pilot signal generator comprises:

an oscillator which generates a radio frequency upstream pilot signal;

a multiplier which multiplies the radio frequency upstream pilot signal to a desired frequency and outputs a multiplied upstream pilot signal;

an AGC (automatic gain control) which outputs a level control signal;

a level controller which controls the level of the multiplied upstream pilot signal in accordance with the level control signal to maintain the multiplied upstream pilot signal at a constant level;

a radio frequency amplifier which amplifies the level controlled multiplied upstream pilot signal and outputs an amplified upstream pilot signal; and a BPF (band pass filter) which receives the output of the radio frequency amplifier and passes only the amplified upstream pilot signal.

3. The apparatus as set forth in claim 2, wherein said pilot generator is included in one of a plurality of terminals in a last cell of a tree structure.

4. The apparatus as set forth in claim 2, wherein said pilot generator is inactive when a pilot signal is not required, so as not to cause interference with other signals.

5. The apparatus as set forth in claim 1, wherein said head-end requests said pilot generator to generate the pilot signal when required.

6. The apparatus as set forth in claim 2, wherein said radio frequency amplifier performs the automatic gain control by utilizing the signal of said pilot generator.

7. The apparatus as set forth in claim 2, wherein the pilot signal generated by said pilot signal generator is constant.

8. The apparatus as set forth in claim 5, wherein the upstream data signals received by said head-end have a constant level.

9. The apparatus as set forth in claim 7, wherein said cable modem provides a constant pilot signal.

10. The apparatus as set forth in claim 9, wherein said cable modem generates a pilot signal only when said headend requires it.

\* \* \* \* \*